United States Patent
Fujita

(10) Patent No.: US 8,874,940 B2
(45) Date of Patent: Oct. 28, 2014

(54) POWER SUPPLY CONTROL SYSTEM WITH POWER FACTOR IMPROVEMENT CIRCUITS AND ELECTRONIC DEVICE EQUIPPED WITH THIS SYSTEM

(75) Inventor: Tsukasa Fujita, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 583 days.

(21) Appl. No.: 13/138,641

(22) PCT Filed: Dec. 2, 2009

(86) PCT No.: PCT/JP2009/006553
§ 371 (c)(1),
(2), (4) Date: Sep. 14, 2011

(87) PCT Pub. No.: WO2010/109563
PCT Pub. Date: Sep. 30, 2010

(65) Prior Publication Data
US 2012/0005493 A1    Jan. 5, 2012

(30) Foreign Application Priority Data

Mar. 25, 2009   (JP) .................................. 2009-74754

(51) Int. Cl.
| | |
|---|---|
| G06F 1/00 | (2006.01) |
| H04N 5/63 | (2006.01) |
| H02M 1/42 | (2007.01) |
| H05B 33/08 | (2006.01) |
| G09G 3/36 | (2006.01) |
| H02M 1/00 | (2006.01) |
| G02F 1/1335 | (2006.01) |
| G09G 3/34 | (2006.01) |

(52) U.S. Cl.
CPC ............... *H04N 5/63* (2013.01); *H02M 1/4208* (2013.01); *Y02B 20/346* (2013.01); *G09G 2320/062* (2013.01); *H02M 2001/0032* (2013.01); *G02F 1/133603* (2013.01); *H05B 33/0815* (2013.01); *G09G 2330/02* (2013.01); *Y02B 70/16* (2013.01); *G02F 2001/133612* (2013.01); *G09G 3/3648* (2013.01); *G09G 3/3426* (2013.01); *Y02B 70/126* (2013.01)

USPC .......................................................... 713/300

(58) Field of Classification Search
USPC .......................................................... 713/300
IPC .................................. G06F 1/32; A01B 12/006
See application file for complete search history.

(56) References Cited

U.S. PATENT DOCUMENTS

| | | | | |
|---|---|---|---|---|
| 5,117,730 | A * | 6/1992 | Yamauchi | ........................ 84/723 |
| 6,184,875 | B1 * | 2/2001 | Matsuura | ...................... 345/211 |
| 7,196,483 | B2 * | 3/2007 | Wey et al. | ....................... 315/312 |

(Continued)

FOREIGN PATENT DOCUMENTS

| | | |
|---|---|---|
| JP | 64-030977 U | 2/1989 |
| JP | 04-033522 A | 2/1992 |

(Continued)

*Primary Examiner* — Mohammed Rehman
(74) *Attorney, Agent, or Firm* — Harness, Dickey & Pierce, P.L.C.

(57) ABSTRACT

In order to provide a power supply control system for driving power supply units efficiently depending on difference between loads, a power supply control system for controlling power supply operation to supply power to an electronic device having a first drive mode and a second drive mode that is driven under a load lower than a load in the first drive mode includes: power supply units each of which includes transformers; and a PFC switching/power supply unit switching section (power supply unit selection section) that, depending on which one of the first and second drive modes the electronic device is in, selects power supply unit(s) to be used from the power supply units, wherein the PFC switching/ power supply unit switching section selects the one or a plurality of power supply units to be used from the plurality of power supply units such that each power supply unit to be used to supply power to the electronic device in the second drive mode is one or some of each power supply unit to be used to supply power to the electronic device in the first drive mode.

6 Claims, 6 Drawing Sheets

(56) References Cited

U.S. PATENT DOCUMENTS

| | | | |
|---|---|---|---|
| 7,496,772 B1 * | 2/2009 | Nguyen | 713/300 |
| 2006/0139966 A1 * | 6/2006 | Lin | 363/21.04 |
| 2006/0240291 A1 * | 10/2006 | Kim et al. | 429/9 |
| 2007/0109289 A1 * | 5/2007 | Ting | 345/211 |
| 2007/0152606 A1 * | 7/2007 | Wey et al. | 315/274 |
| 2008/0079756 A1 | 4/2008 | Akai et al. | |

FOREIGN PATENT DOCUMENTS

| | | |
|---|---|---|
| JP | 2002291247 A | 10/2002 |
| JP | 2007306050 A | 11/2007 |
| JP | 2008067559 A | 3/2008 |
| JP | 2008083604 A | 4/2008 |
| JP | 2008295216 A | 12/2008 |

* cited by examiner

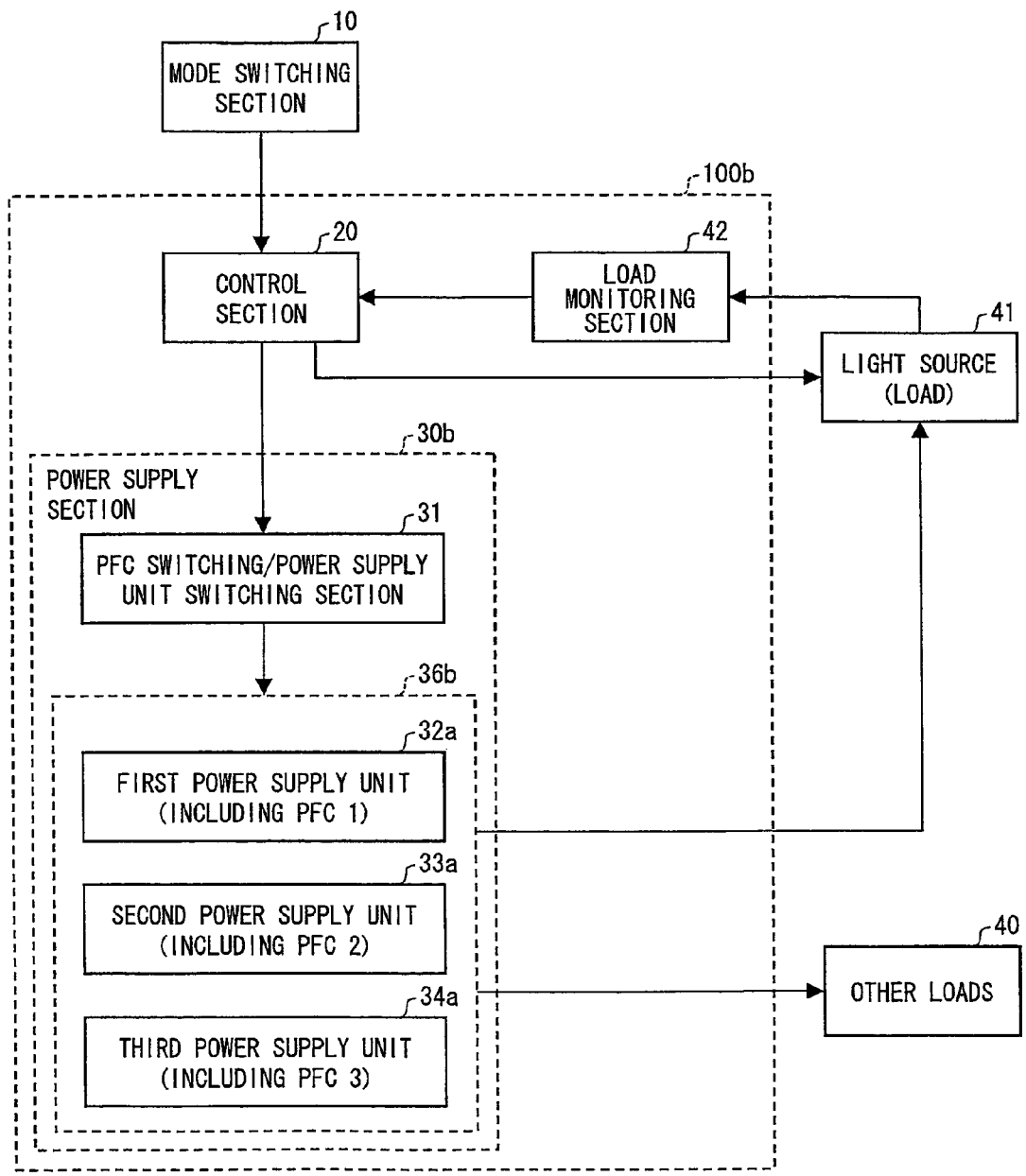

POWER SUPPLY CONTROL SYSTEM WITH POWER FACTOR IMPROVEMENT CIRCUITS AND ELECTRONIC DEVICE EQUIPPED WITH THIS SYSTEM

TECHNICAL FIELD

The present invention relates to a power supply control system and an electronic device including the power supply control system.

BACKGROUND ART

In recent years, there is introduced a new viewing style for television. In the new viewing style, an ultra-slim large-screen television such as a liquid crystal television, which is capable of displaying high quality image and playing high quality sound, is hung on a wall or mounted on a television stand for mounting the television against wall, and displays a still image of a painting, a picture, etc. (which is called generally as an "ornamental image") to enjoy the displayed image when not viewing a television image.

Therefore, for example in a large-screen television, there is a further demand for technique for displaying an ornamental image or the like by power-saving drive for driving as low power as possible.

Various techniques for televisions have been already proposed for realizing power-saving drive depending on differences between usage statuses regardless of whether or not the ornamental image or the like is displayed.

For example, Patent Literature 1 discloses a technique for providing a power reduction apparatus for a liquid crystal television receiver, being capable of switching its power supply between a battery and a power supply adapter. The power reduction apparatus determines which one of the battery and the power supply adapter is used as the power supply. When the battery is selected as the power supply, the power reduction apparatus causes a backlight unit to perform backlighting at low brightness, and when the power supply adapter is selected, the power reduction apparatus causes the backlight unit to perform the backlighting at high brightness.

Further, Patent Literature 2 discloses a technique for controlling, in a liquid crystal television, brightness of a backlight unit and power distribution status for a liquid crystal display processing section, depending on a result of determination for determining whether or not a video signal detection circuit detects a video signal to be displayed.

Furthermore, Patent Literature 3 discloses a technique for improving visibility for a moving image while realizing low power consumption by controlling a backlight unit. Specifically, brightness of the backlight unit is adjusted depending on the kinds of the images to be displayed. For a still image and a moving image displayed together on a display screen, elongatedness of display data of the still image is different from that of the moving image, so that the moving image becomes higher in surface brightness than the still image.

CITATION LIST

Patent Literature

Patent Literature 1
 Japanese Utility Model Application Publication, Jistukai-sho, No. 64-30977 (Publication Date: Feb. 27, 1989)
Patent Literature 2
 Japanese Patent Application Publication, Tokukai, No. 2007-306050 A (Publication Date: Nov. 22, 2007)
Patent Literature 3
 Japanese Patent Application Publication, Tokukai, No. 2008-083604 A (Publication Date: Apr. 10, 2008)

SUMMARY OF INVENTION

Technical Problems

To be short, the conventional art described in Patent Literature 1 is a technique for prolonging a service life of the battery, by causing the backlight unit to perform the backlighting at the low brightness in a state in which the battery is selected as the power supply. That is, the conventional art described in Patent Literature 1 is a merely a technique for adjusting a magnitude of a load depending on ability of the selected power supply. Thus, the conventional art described in Patent Literature 1 has a problem in that, in the case of displaying, for example, a moving image when the power supply adapter cannot be used, the battery is necessarily selected as the power supply, thus the backlighting has to be performed at brightness lower than normal brightness needed for displaying the moving image.

Further, in the conventional art described in Patent Literature 2, although power consumption can be reduced depending on whether video (image) is displayed, there is a problem in that driving efficiency of the power supply is reduced particularly during driving at low power consumption (during driving under a low load).

Similarly, in the conventional art described in Patent Literature 3, power consumption can be reduced depending on the kinds of the displayed images, but there is a problem in that driving efficiency of the power supply is reduced particularly during driving at low power consumption (during driving under a low load).

That is, both the related arts described in the above-mentioned Patent Literatures 2 and 3 have the common problem in that the power supply cannot be driven in an efficient way selected depending on whether load is high or low.

In the following, we explain a reason why the driving efficiency of the power supply is reduced particularly during the driving at the low power consumption in the above-mentioned Patent Literatures 2 and 3. For example, a power supply including a transformer such as an LLC resonance type power supply is generally used for a power supply of a liquid crystal television, and a current is constantly flown to a primary side irrespective of a load on a secondary side. This current is called as an exciting current.

Generally, a loss caused by the exciting current is mainly divided into a copper loss (loss caused by a coil) and an iron loss (loss caused by a core). The loss is substantially constant on the secondary side between under a maximum load and under a minimum load. Therefore, the lower the load, the higher a loss rate caused by the exciting current with respect to output of the whole power supply. Further, the exciting current cannot be zero in principle. Therefore, in the power supply including the transformer, the driving efficiency under a low load is lower than driving efficiency under a higher load. Although other causes of the loss occurred under the low load can be considered, the loss caused by the exciting current is dominative.

In view of the above-mentioned problems, a main object of the present invention is to provide a novel technique for driving power supplies in an efficient way selected depending on whether load is high or low, and particularly, a new technique for driving power supplies effectively in the case where driving under a lower load is needed.

Solution to Problems

In order to attain the object, the present invention provides a power supply control system for controlling power supply operation to supply power to an electronic device having a first drive mode and a second drive mode that is driven under a load lower than a load in the first drive mode, the power control system including: a plurality of power supply units each of which includes a transformer; and a power supply unit selection section that, depending on which one of the first and second drive modes the electronic device is in, selects the one or plurality of power supply units to be used from the power supply units, wherein the power supply unit selection section selects the one or a plurality of power supply units to be used from the plurality of power supply units such that each power supply unit to be used to supply power to the electronic device in the second drive mode is one or some of each power supply unit to be used to supply power to the electronic device in the first drive mode.

The loss in the transformers is substantially constant irrespective of the magnitude of the loads. Therefore, the loss rate of the total power to be supplied becomes higher for a lower load (that is, power usage efficiency is reduced). According to the above-mentioned configuration, however, in the second drive mode that is driven under a lower load, all the required power is supplied by using the smaller number of the power supply units in comparison with the case of the first drive mode. Thus, each of the power supply units can be actuated in more effective domains in comparison with the case where all the power supply units are used. That is, there is obtained an effect in which the respective power supply units can be driven effectively depending on the drive modes corresponding to different loads.

Advantageous Effects of Invention

The present invention provides a new power supply control system for controlling power supply operation to supply power to an electronic device having a first drive mode and a second drive mode that is driven under a load lower than that in the first drive mode, wherein the power supply control system drives the power supply units effectively depending on the drive modes corresponding to whether the load is high or low, i.e., the first drive mode and the second drive mode.

BRIEF DESCRIPTION OF DRAWINGS

FIG. 7 is a block diagram illustrating a configuration of a main part of a power supply control system according to Embodiment 3 of the present invention.

DESCRIPTION OF EMBODIMENTS

[Embodiment 1]

Hereinafter, an embodiment of the present invention will be described in detail with reference to FIGS. 1 to 4.

(Configuration of Power Supply Control System)

Figure 1:
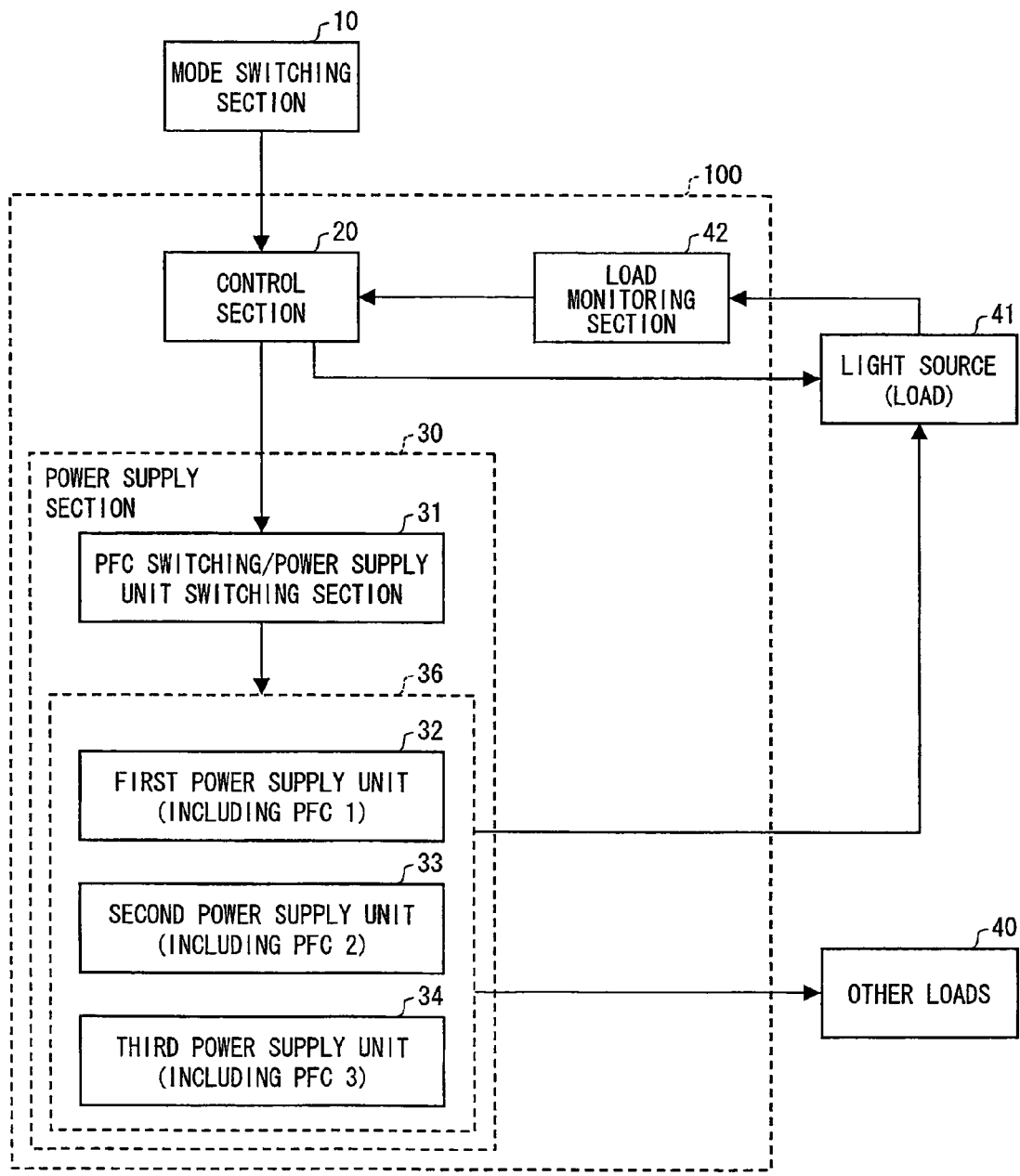
FIG. 1 is a block diagram illustrating a configuration of a main part of a power supply control system according to Embodiment 1 of the present invention.

FIG. 1 is a schematic block diagram illustrating a configuration of a main part of a power supply control system 100 according to this embodiment. To be brief, the power supply control system 100 allows such a power supply operation for an electronic device being capable of supplying power in an efficient way selected depending on respective drive modes, wherein the electronic device to be supplied with power having a first drive mode (high-load drive mode) and a second drive mode (low-load drive mode) that is demanded for driving under a load lower than that in the first drive mode. For example, one of features of the power supply control system 100 is that the power supply control system 100 control power supply to supply power by using all power supply units 32 to 34 in the high-load drive mode, and to supply power by using only a part of the power supply units 32 to 34 (one or two) in the low-load drive mode. Therefore, the power supply control system 100 enables an effective drive in terms of power usage efficiency even in the low-load drive mode, while using the power supply units 32 to 34 that are also used in the high-load drive mode.

Hereinafter, in this embodiment, the power supply control system 100 will be described as a system for controlling power supply operation to supply power to a light source (light source device: electronic device) 41, which is provided to a liquid crystal television (not shown), and to other loads 40 as necessary.

Herein, the liquid crystal television has a "moving image display mode" and an "ornamental image display mode" as display modes. The moving image display mode displays a moving image such as a television image, a video image, a DVD image, or the like, and the ornamental image display mode displays a still image for viewing (ornamental image/wall picture image) such as a painting, a picture, or the like. For the purpose of improving visibility of the moving image or for other purposes, the light source 41 is driven with high brightness about, for example, 450 $(cd/m^2)$ in the moving image display mode. Meanwhile, for the purpose of showing the still image as if a real painting or picture, harmonizing the still image with its surrounding environment, or for other purposes, the light source 41 is driven with low brightness about, for example, 150 $(cd/m^2)$ in the ornamental image display mode.

That is, the light source 41 has a high-luminance drive mode (first drive mode: high-load drive mode) and a low-luminance drive mode (second drive mode: low-load drive mode). The high-luminance drive mode corresponds to the moving image display mode. The low-luminance drive mode, which is driven under a load lower than that in the high-luminance drive mode, corresponds to the ornamental image display mode. In terms of a power consumption in the light source 41, the low-brightness drive mode is lower in power consumption than the high-brightness drive mode.

The power supply control system 100 for controlling power supply operation to supply power to the light source 41 and the like includes a power supply section 30, a load monitoring section 42, a mode switching section 10, and a control section 20.

The load monitoringload monitoring section 42 constantly monitors to detect a fluctuation of the load in the light source 41, and outputs a result of the detection to the control section 20. Herein, the term "fluctuation of load" refers to, for example, a decrease in load due to switching from the above-mentioned high-brightness drive mode to the low-brightness drive mode, or an increase in load due to switching from the above-mentioned low-brightness drive mode to the high-brightness drive mode. A well-known method can be appropriately used for monitoring the load. Note that, the load monitoring section may be provided on the side of the liquid crystal television set as necessary.

The result detected from the load monitoring section 42 and information as to which one of the drive modes is selected by a mode switching section 10 are inputted to the control section 20. The control section 20 generates a control signal based on at least one of the two kinds of input information. Then, an operation of the power supply section 30 is controlled by the control signal. Note that, the mode switching section 10 is, for example, an input button provided to the liquid crystal television or a receiver section (not shown) that receives input from a remote control. An operator selects the above-mentioned high-brightness drive mode or low-brightness drive mode via the mode switching section 10.

The power supply section 30 includes a PFC switching/power supply unit switching section (power supply unit selection section/power-factor improvement circuit control section) 31 and a power supply unit section 36. The power supply unit section 36 includes the three power supply units 32 to 34 (for example, the so-called power supply units, such as LLC resonance type power supply units, which utilize transformers and have inverter type power supply circuits) including the transformers (so-called power supply transformers (not shown)). Further, the power supply units 32 to 34 include power-factor improvement circuits PFC 1 to PFC 3 on first sides of the transformers, respectively. Note that, each of the power supply units 32 to 34 includes a power supply circuit, and thus one power supply unit alone is capable of supplying power to the light source 41. In this embodiment, the respective power supply units 32 to 34 have substantially the same configuration. As described below, the power supply unit section 36 changes the power supply units 32 to 34 to be used depending on differences between the drive modes of the light source 41, to supply power to the light source 41. Furthermore, the power supply unit section 36 also supplies power to the other loads 40 as necessary in addition to the light source 41 of the liquid crystal television. Note that, the power supply unit section 36 is supplied with power from the outside via a power supply adapter (not shown).

The control signal generated in the control section 20 is inputted to the PFC switching/power supply unit switching section 31. The PFC switching/power supply unit switching section 31 selects the power supply unit(s) to be used from among the power supply units 32 to 34 in accordance with the control signal, and in addition, switches on or off the power-factor improvement circuits PFC 1 to PFC 3 of the power supply units 32 to 34, that is, switches whether to actuate or not actuating the power-factor improvement circuits PFC 1 to PFC 3.

(Details of Operation Control of Power Supply Control System)

Figure 2:
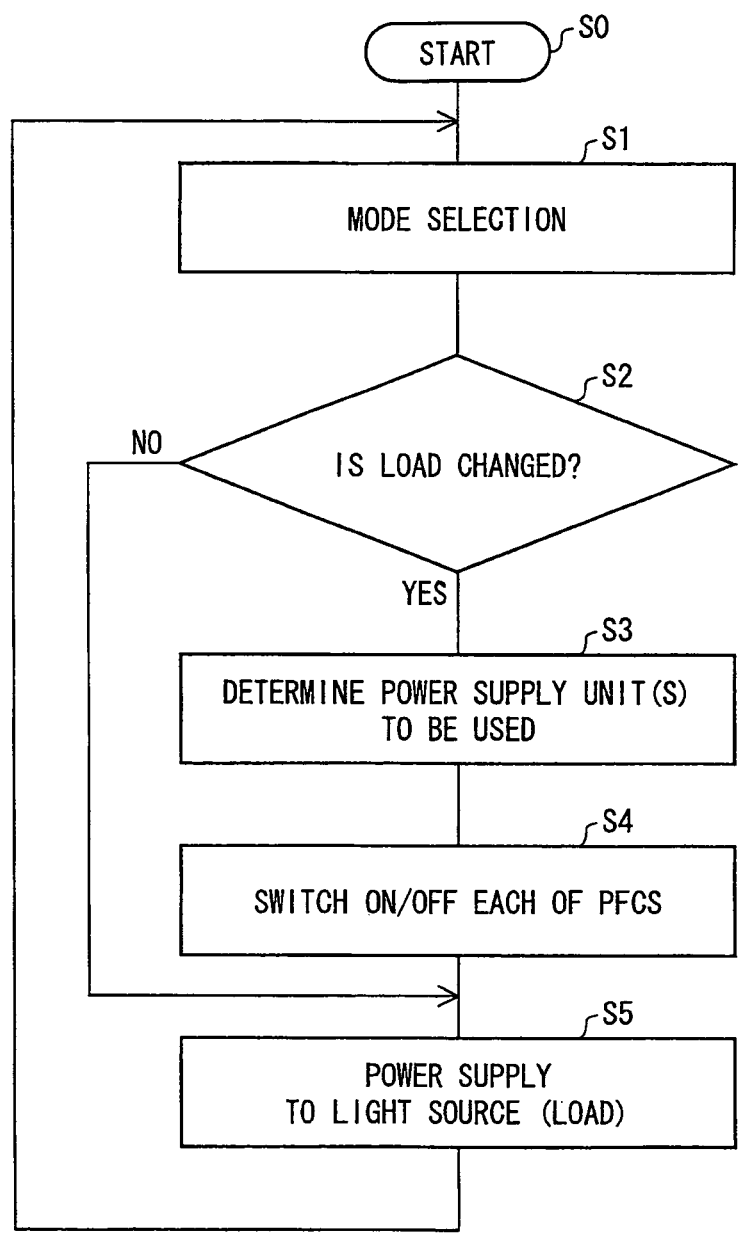
FIG. 2 is a flowchart illustrating an example of an operating control of the power supply control system illustrated in FIG. 1.

Next, description of an operation control of the power supply control system 100 illustrated in FIG. 1 will be made in detail with reference to FIG. 1 and FIG. 2. FIG. 2 is a flowchart illustrating an example of the operating control of the power supply control system 100.

In Step S0, the liquid crystal television is in one of the moving image display mode and the ornamental image display mode.

Then, in Step S1, an operator performs input to the mode switching section 10 (FIG. 1) of the liquid crystal television so as to perform mode selection operation to select the moving image display mode or the ornamental image display mode. Herein, the power supply control system 100 drives the light source 41 in the high-brightness drive mode when the moving image display mode is selected, and drives the light source 41 in the low-brightness drive mode when the ornamental image display mode is selected.

In Step S2, the power supply control system 100 (control section 20) determines whether or not the magnitude of the load in the light source 41 is changed by the mode selection operation performed in Step S1. For example, Step S2 may be performed as described in the following Example 1 or 2. Example 1: in the case the control section 20 receives from the mode switching section 10 such information that the display mode selected by the mode selection operation is different from a display mode in which the liquid crystal television was driven right before the mode selection operation, the control section 20 determines that the magnitude of the load is changed. Example 2: the load in the light source 41 is constantly monitored by the load monitoring section 42, which outputs a result of the monitoring to the control section 20, and the control section 20 determines that the magnitude of the load is changed based on change of the result of the monitoring.

In Step S2, when the magnitude of the load in the light source 41 is not changed, processing proceeds to Step S5, and the power supply control system 100 continues to supply power to the light source 41 until the mode is selected again (in other words, Step S1 is performed again).

In Step S2, when the magnitude of the load in the light source 41 is changed, processing proceeds to Step S3, and the power supply control system 100 (PFC switching/power supply unit switching section 31) selects the power supply unit(s) to be used from among the power supply units 32 to 34. For example, in Step S2, when it is determined that the magnitude of the load in the light source 41 is decreased (in other words, the high-brightness drive mode is switched to the low-brightness drive mode), the PFC switching/power supply unit switching section 31 switches to a state of performing the power supply operation with only the power supply unit 32 from a state of performing the power supply operation with all the three power supply units 32 to 34. Meanwhile, in Step S2, when it is determined that the magnitude of the load in the light source 41 is increased (in other words, the low-brightness drive mode is switched to the high-brightness drive mode), the PFC switching/power supply unit switching section 31 selects to switch to the state of performing the power supply operation with all the three power supply units 32 to 34 from the state of performing the power supply operation with only the power supply unit 32.

Then, processing proceeds to Step S4, and the power supply control system 100 (PFC switching/power supply unit switching section 31) determines whether the power-factor improvement circuits PFC 1 to PFC 3 of the power supply units 32 to 34 are turned on or not (are actuated or not) in accordance with the selection in Step S3. For example, in Step S3, in the case where all the power supply units 32 to 34 are used for the high-brightness drive mode, the power-factor improvement circuits PFC 1 to PFC 3 are all turned on. Meanwhile, in Step S3, in the case where only the power supply unit 32 is used for the low-brightness drive mode, the power-factor improvement circuit PFC 1 thereof is turned off.

Then, processing proceeds to Step S5, and the power supply control system 100 causes power to be supplied to the light source 41 by using the one or plurality of power supply units that is or are selected in Step S3 from among the power supply units 32 to 34. The power supply control system 100 continues to supply power to the light source 41 until the mode is selected again (in other words, Step S1 is performed again).

(Improvement of Power Efficiency Under Low Load)

Figure 3:
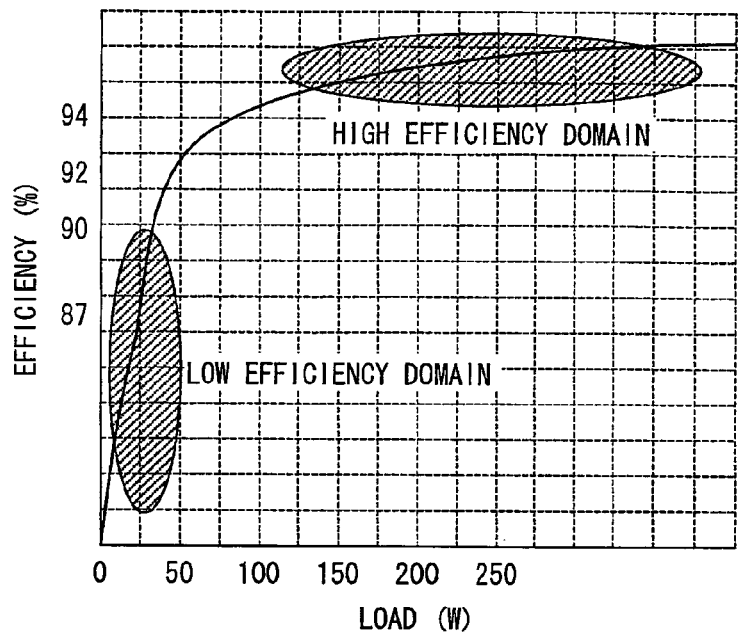
FIG. 3 is a schematic view illustrating a relationship between a magnitude of a load in a light source and efficiency in the case where a light source is supplied with power from one power supply unit including a transformer.

Hereinafter, an example of effects obtained by using the power supply control system 100 of the present invention will be described with reference to FIG. 3 and the like. FIG. 3 is a graph for schematically illustrating a relationship between the magnitude of the load in the light source (X axis) and power efficiency (Y axis) in the case where the light source (load) is supplied with power from one power supply unit including a transformer (corresponding to the power supply unit 32, for example). For example, assuming that the light source (corresponding to the light source 41) needs to be supplied with power of 400 W in the high-brightness drive mode corresponding to the moving image display mode, whereas the light source (corresponding to the light source 41) needs to be supplied with power of 75 W to 80 W in the low-brightness drive mode corresponding to the ornamental image display mode. That is, fluctuation of the load in the light source becomes about one fifths when the high-brightness drive mode is switched to the low-brightness drive mode.

As illustrated in FIG. 3, when the load in the light source is decreased, efficiency of the power supply unit including the transformer is reduced. That is, with respect to a ratio of a loss caused by an exciting current generated in the transformer over power outputted by the power supply unit becomes higher when the load becomes lower. In addition, in the case where power (75 W to 80 W), which is about one fifths of a maximum value (400 W), is supplied dispersedly by the plurality of power supply units (corresponding to all the power supply units 32 to 34, for example), this causes such a situation that all the plurality of power supply units are driven inefficiently.

However, in the power supply control system 100 of the present invention, when the light source 41 is driven in the low-brightness drive mode, all power needed for the light source 41 is supplied by the smaller number of the power supply units among the power supply units 32 to 34 (only the power supply unit 32, for example) in comparison with the high-brightness drive mode. Therefore, efficiency of the respective power supply units in the low-brightness drive mode can be improved in comparison with the case where the number of the power supply units is same as the number of the power supply units that is used in the high-brightness drive mode. Thus, for example, the ornamental image can be displayed with the lower consumption power. Further, heat radiation design of the respective power supply units or the power supply section can be simplified because heat generation in the respective power supply units is reduced.

Figure 4:
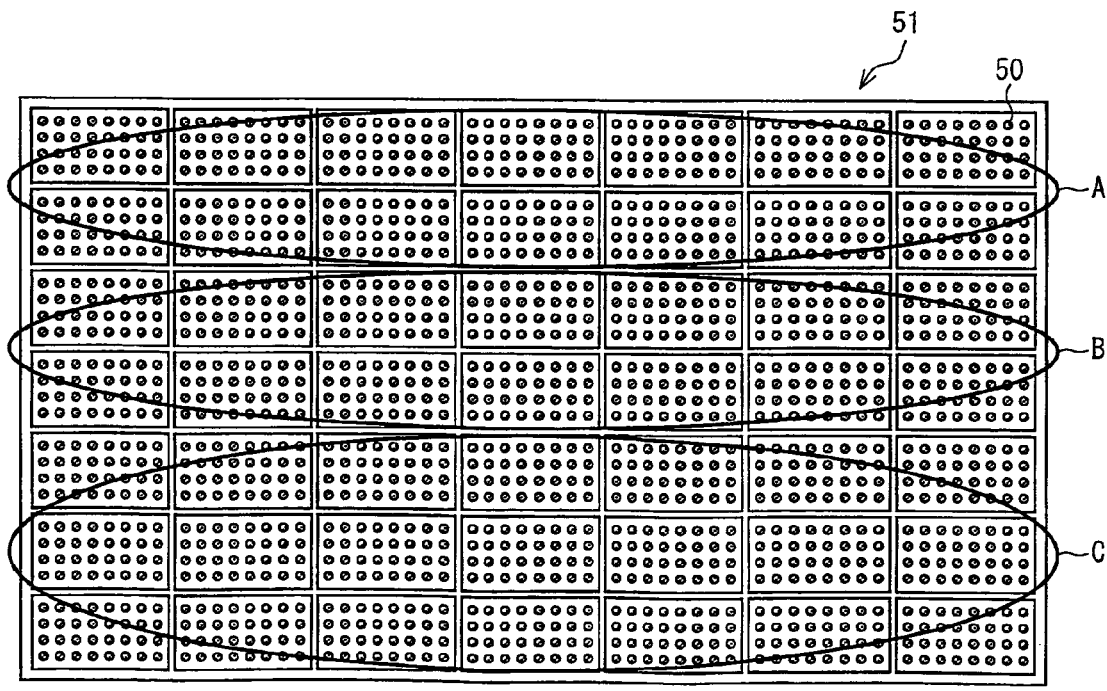
FIG. 4 is a view illustrating a schematic configuration of a power supply that is supplied with power by the power supply control system illustrated in FIG. 1.

More specifically, for example, in order to realize a domain active control (operation control in units of divided domains), further description will be made based on the case where a light emitting section 51 of the light source 41 is divided into three parts, i.e., a domain A (divided domain), a domain B (divided domain), and a domain C (divided domain), and a plurality of light emitting diodes (LEDs) 50 are arrayed in the domains A to C (See FIG. 4).

In this case, in the high-brightness drive mode, the power supply control system 100 controls the power supply units 32, 33, and 34 so that the power supply unit 32 supplies power to the LEDs 50 in the domain A, the power supply unit 33 supplies power to the LEDs 50 in the domain B, and the power supply unit 34 supplies power to the LEDs 50 in the domain C. Meanwhile, in the low-brightness drive mode, two power supply units selected from the power supply units 32 to 34 cooperate to supply power to all the LEDs in the domains A to C, or one power supply unit supplies power to all the LEDs 50 in the domains A to C.

Next, assuming that all the power supplied to the LEDs 50 is 75 W under the low-brightness drive mode, the power efficiency is compared between the case where one power supply unit supplies power to all the LEDs 50 in the domains A to C (present invention) and the case where the respective power supply units supply power to the corresponding LEDs 50 in the domains A to C (related art). Note that, the relationship between the magnitude of the load in the light source and the power efficiency is assumed to obey the relationship illustrated on the graph illustrated in FIG. 3.

Firstly, in the conventional configuration, power of 75 W is supplied by the three power supply units, and thus each of the power supply units supplies power of 25 W, therefore the efficiency is about 87% (loss of 3 W) (See also FIG. 3). Accordingly, a loss of the three power supply units as a whole is 3 W×3 units=9 W. Meanwhile, in the configuration of the present invention, power of 75 W is supplied by one power supply unit, i.e., the power per one power supply unit is 75 W, therefore the efficiency is about 94% (4 W of loss) (See also FIG. 3). Thus, the configuration of the present invention can reduce power loss of about 5 W in comparison with the case if the conventional configuration.

As described above, in order to improve the efficiency, for example in the ornamental image display mode in the liquid crystal television, the power supply control system according to this embodiment is configured to control by turning on or off the plurality of power supply units depending on the loads. Specifically, all the plurality of power supply units are actuated to supply power under a maximum load. Meanwhile, in the ornamental image display mode (lower-load state than the maximum-load state), only one power supply unit is turned on and the rest power supply units are turned off. That is, one power supply unit solely bears the duty of supplying power. Thereby, the driving efficiency of the power supply unit can be in a high-efficiency domain.

(Other Embodiments)

In the above-mentioned description, the configuration in which the PFC switching/power supply unit switching section 31 switches on or off the power supply units 32 to 34 depending on the drive modes of the light source 41 has been exemplified. However, even in an embodiment where all the power supply units 32 to 34 are used irrespective of the drive modes, a power reduction effect can be obtained by switching on or off the power-factor improvement circuits PFC 1 to PFC 3 depending on the kinds of the drive modes.

Specifically, in the power supply control system 100 as illustrated in FIG. 1, the PFC switching/power supply unit switching section (power-factor improvement circuit control section) 31 turns on all the power-factor improvement circuits PFC 1 to PFC 3 in the high-brightness drive mode (first drive mode) of the light source 41, whereas, in the low-brightness drive mode (second drive mode) of the light source 41, at least one of the power-factor improvement circuits PFC 1 to PFC 3, and preferably all the power-factor improvement circuits PFC 1 to PFC 3 are turned off. In both the high-brightness drive mode and the low-brightness drive mode, the power supply control system 100 causes power to be supplied to the light source 41 by using all the power supply units 32 to 34.

In comparison with the high-brightness drive mode, the power efficiency (loss rate occurred in the circuit with respect to supplied power) in the power-factor improvement circuits PFC 1 to PFC 3 is further decreased in the low-brightness drive mode to be applied with a lower load. The efficiency is remarkably reduced particularly in the configuration in which the power-factor improvement circuit includes a coil. Therefore, at least one of the power-factor improvement circuits PFC 1 to PFC 3 is turned off (is not operated) only in the low-brightness drive mode, the loss generated in the power-factor improvement circuit (loss in metal-oxide-semiconductor (MOS) and loss in a coil) is reduced.

[Embodiment 2]

Hereinafter, another embodiment of the present invention will be described in detail with reference to FIG. 5 and FIG. 6.

(Configuration of Power Supply Control System)

Figure 5:
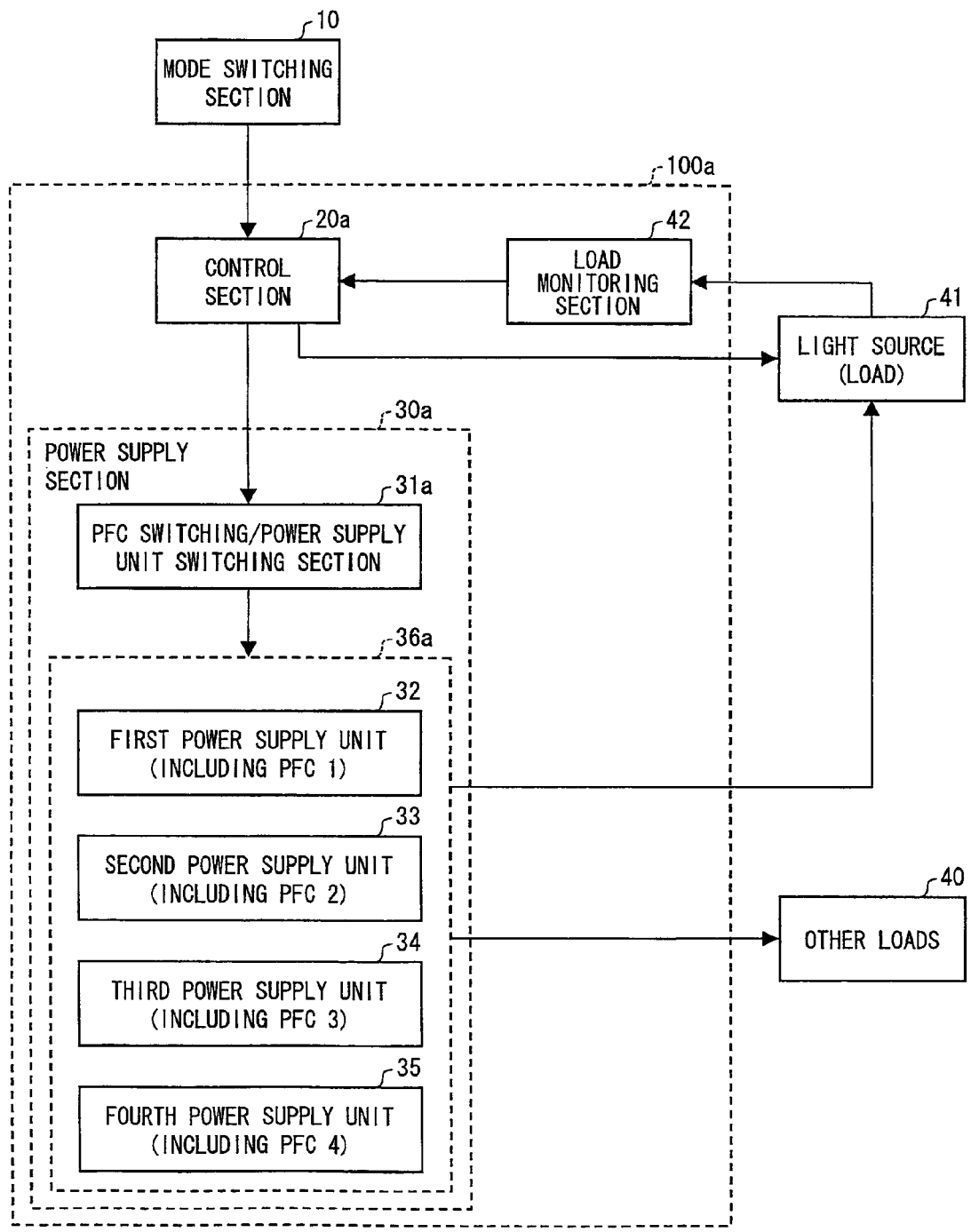
FIG. 5 is a block diagram illustrating a configuration of a main part of a power supply control system according to Embodiment 2 of the present invention.
Figure 6:
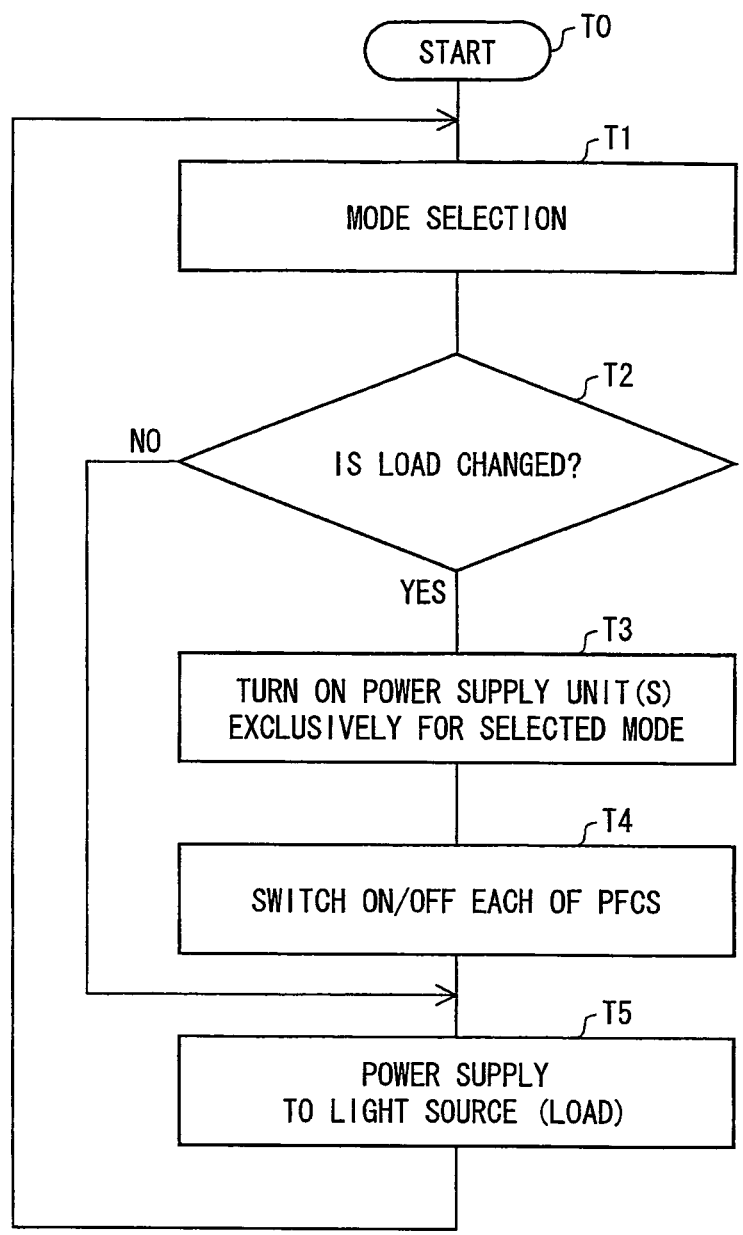
FIG. 6 is a flowchart illustrating an example of an operating control of the power supply control system illustrated in FIG. 5.

FIG. 5 is a schematic block diagram illustrating a configuration of a main part of a power supply control system 100*a* according to this embodiment. Note that, in FIG. 5, the same components as those of FIG. 1 are denoted by the same reference symbols, and the detailed description thereof is omitted.

To be short, as well as the case of the power supply control system 100 illustrated in Embodiment 1, the power supply control system 100*a* enables power supply performed in an efficient way selected depending on the respective drive modes in the case where the electronic device to be supplied with power has the first drive mode (high-load drive mode) and the second drive mode (low-load drive mode) that needs to be driven under a load lower than that in the first drive mode. Specifically, one of features is that, in the high-load drive mode, the power supply control system 100 causes power to be supplied by using all the power supply units 32 to 34 (in other words, without using a power supply unit 35), and in the low-load drive mode, the power supply control system 100 causes power to be supplied by using only the power supply unit 35 for the exclusive use of the low-load drive mode.

The power supply control system 100*a* for controlling power supply operation to supply power to the light source 41 and the like includes a power supply section 30*a*, the load monitoring section 42, the mode switching section 10, and a control section 20*a*.

A result of monitoring performed by the load monitoring section 42 and information as to which one of the drive modes is selected by the mode switching section 10 are inputted to the control section 20*a*. The control section 20*a* generates a control signal based on at least one of the two kinds of the input information. Then, an operation of the power supply section 30*a* is controlled by the control signal.

The power supply section 30*a* includes a PFC switching/power supply unit switching section (power supply unit selection section/power-factor improvement circuit control section) 31*a* and a power supply unit section 36*a*. The power supply unit section 36*a* includes the four power supply units 32 to 35 including transformers (not shown). Further, the power supply units 32 to 35 include the power-factor improvement circuits PFC 1 to PFC 4, respectively.

Note that, the power supply unit 35 is used exclusively for the above-mentioned second drive mode (low-load drive mode), and is configured such that the loss caused by the exciting current generated in the transformer of the power supply unit 35 is lower than that of the power supply units 32 to 34 (power supplies for the exclusive use of the first drive mode) under a load condition corresponding to the second drive mode. Therefore, power usage efficiency can be more improved in comparison with the case of supplying power by using the same power supply units irrespective of the drive modes.

Specifically, for example, in the case where the same material is used as a core, a shape of the core of the transformer of the power supply unit 35 is formed so as to be smaller than each of shapes of cores of the transformers of the power supply units 32 to 34. Alternatively, in the case where the cores have the same shapes, a core material having the so-called iron loss, which is lower than core materials of the transformers of the power supply units 32 to 34, is employed as a core material of the transformer of the power supply unit 35. That is, the configuration described above can be realized by adjusting at least one of the material of the cores of the power supply units 32 to 35 and the shapes thereof.

Note that, generally, a loss caused by exciting cur6ent in a transformer is mainly divided into a copper loss (loss caused by a coil) and the iron loss (loss caused by a core). The transformer of the power supply unit 35 may be formed to reduce at least one of those losses more than the transformers of the power supply units 32 to 34 under the load condition corresponding to the second drive mode. Note that, as exemplified above, it is more preferred that the iron loss be lowered because the iron loss becomes more dominative as the load becomes lower.

The control signal generated in the control section 20*a* is inputted to the PFC switching/power supply unit switching section 31*a*. The PFC switching/power supply unit switching section 31*a* selects the power supply unit(s) to be used from among the power supply units 32 to 35 in accordance with the control signal, and in addition, switches on or off the power-factor improvement circuits PFC 1 to PFC 4 of the power supply units 32 to 35.

(Details of Operation Control of Power Supply Control System)

Next, description of an operation control of the power supply control system 100*a* will be made in detail with reference to FIG. 5 and FIG. 6. FIG. 6 is a flowchart illustrating an example of the operation control of the power supply control system 100*a*.

In Step T0, the liquid crystal television is in one display mode, i.e., the moving image display mode or the ornamental image display mode.

Then, in Step T1, an operator performs input to the mode switching section 10 (FIG. 5) of the liquid crystal television so as to perform mode selection operation to select the moving image display mode or the ornamental image display mode. Herein, the power supply control system 100*a* drives the light source 41 in the high-brightness drive mode when the moving image display mode is selected, and drives the light source 41 in the low-brightness drive mode when the ornamental image display mode is selected.

In Step T2, the power supply control system 100*a* (control section 20*a*) determines whether or not the magnitude of the load in the light source 41 is changed by the mode selection operation performed in Step T1. Note that, details of determination are same as those of Embodiment 1, and thus description thereof is omitted.

In Step T2, when the magnitude of the load in the light source 41 is not changed, processing proceeds to Step T5, and the power supply control system 100*a* continues to supply power to the light source 41 until the mode is selected again (in other words, Step T1 is performed again).

In Step T2, when the magnitude of the load in the light source 41 is changed, processing proceeds to Step T3, and the power supply control system 100*a* (PFC switching/power supply unit switching section 31*a*) selects the power supply unit(s) to be used from among the power supply units 32 to 35 in accordance with the selected mode. For example, in Step T2, when it is determined that the magnitude of the load in the light source 41 is decreased (in other words, the high-brightness drive mode is switched to the low-brightness drive mode), the PFC switching/power supply unit switching section 31a selects to switch to a state of using only the power supply unit 35 from the state of using the three power supply units 32 to 34 to supply power. Meanwhile, in Step T2, when it is determined that the magnitude of the load in the light source 41 is increased (in other words, the low-brightness drive mode is switched to the high-brightness drive mode), the PFC switching/power supply unit switching section 31a selects to switch to the state of performing the power supply operation with all the three power supply units 32 to 34 from the state of performing the power supply operation with only the power supply unit 35.

Then, processing proceeds to Step T4, and the power supply control system 100a (PFC switching/power supply unit switching section 31a) determines whether the power-factor improvement circuits PFC 1 to PFC 4 of the power supply units 32 to 35 are turned on or not (are actuated or not) in accordance with the selection in Step T3. For example, in Step T3, in the case where the power supply units 32 to 34 are used for the high-brightness drive mode, the power-factor improvement circuits PFC 1 to PFC 3 are all turned on. Meanwhile, in Step T3, in the case where only the power supply unit 35 is used for the low-brightness drive mode, the power-factor improvement circuit PFC 4 thereof is turned off.

Then, processing proceeds to Step T5, and the power supply control system 100a causes power to be supplied to the light source 41 by using the one or plurality of power supply units that are selected in Step T3 from among the power supply units 32 to 35. The power supply control system 100a continues to supply power to the light source 41 until the mode is selected again (in other words, Step T1 is performed again).

As described above, for example, in order to improve efficiency in the ornamental image display mode of the liquid crystal television, the power supply unit for the exclusive use of the ornamental image display mode is provided to the power supply control system according to this embodiment. Because the load in the ornamental image display mode is constant, it is preferred that the power supply unit optimally designed exclusively for the load be provided so as to achieve high efficiency. Meanwhile, in the ornamental image display mode, all the power supply units are turned off other than the power supply unit for the exclusive use of the load in the ornamental image display mode.

[Embodiment 3]

Hereinafter, another embodiment of the present invention will be described in detail with reference to FIG. 7.

(Configuration of Power Supply Control System).

FIG. 7 is a schematic block diagram illustrating a configuration of a main part of a power supply control system 100b according to this embodiment. Note that, in FIG. 7, the like components as those of FIG. 1 are denoted by the like reference symbols, and the detailed description thereof is omitted.

To be short, as well as the power supply control system 100 illustrated in Embodiment 1, the power supply control system 100b enables a power supply performed in an efficient way selected depending on the respective drive modes, wherein the electronic device to be supplied with power has the first drive mode (high-load drive mode) and the second drive mode (low-load drive mode) that needs to be driven under a load lower than that in the first drive mode. Specifically, one of features of the power supply control system 100b is that the power supply control system 100b causes power to be supplied by using optimal one or ones of the power supply units 32a to 34a for the selected drive mode, the power supply units 32a to 34a being provided for the different loads.

The power supply control system 100b for controlling power supply operation to supply power to the light source 41 and the like includes a power supply section 30b, the load monitoring section 42, the mode switching section 10, and the control section 20.

A result of monitoring performed by the load monitoring section 42 and information as to which one of the drive modes is selected by the mode switching section 10 are inputted to the control section 20. The control section 20 generates a control signal based on at least one of the two kinds of the input information. Then, an operation of the power supply section 30b is controlled by the control signal.

The power supply section 30b includes the PFC switching/power supply unit switching section (power supply unit selection section/power-factor improvement circuit control section) 31 and a power supply unit section 36b. The power supply unit section 36b includes the three power supply units 32a to 34a including transformers (not shown). Further, the power supply units 32a to 34a include the power-factor improvement circuits PFC 1 to PFC 3, respectively.

The power supply units 32a to 34a are each provided to correspond to the different loads. Specifically, for example, the power supply unit 32a is used for the load in the range from 0 W to 100 W, the power supply unit 33a is used for the load in the range from 100 W to 200 W, and the power supply unit 34a is used for the load in the range from 300 W to 400 W. Further, the power supply unit section 36b corresponds to another range of the load by combining more than two of the power supply units 32a to 34a. That is, the power supply units 32a and 33a are combined, to thereby serve as a power supply for a load in the range from 200 W to 300 W, and the power supply units 32a and 34a are combined, to thereby serve as a power supply for a load in the range from 400 W to 500 W. In addition, the power supply units 33a and 34a are combined, to thereby serve as a power supply for a load in the range from 500 W to 600 W, and all the power supply units 32a to 34a are combined, to thereby serve as a power supply for an even higher load.

Note that, as described above, the term "power supply for the load having the predetermined magnitude (for example, from 0 W to 100 W)" refers to one or ones(combination) of the power supply units 32a to 34a selected from the power supply units 32a to 34a, which show(s) a minimum sum of the power loss(e) caused by the exciting current generated in the transformers (power supply transformers) of the power supply units 32a to 34a under the above-mentioned load having predetermined magnitude. In other words, the term "power supply for the load having the predetermined magnitude" refers to the power supply that is optimized for the load having the predetermined magnitude.

Note that, in this embodiment, the light source 41 is driven by multiple kinds of drive modes that are different in required display brightness (in other words, different in loads) from one another, such as an audio only mode, the ornamental image display mode, a modulated dark mode (min), a modulated center mode (typ), and a modulated bright mode (max). In the case where three or more types of the drive modes are present as described above, two drive modes are selected arbitrary, and one drive mode to be applied with a higher load corresponds to the first drive mode, and another drive mode to be applied with a lower load corresponds to the second drive mode.

The control signal generated in the control section 20 is inputted to the PFC switching/power supply unit switching section 31. The PFC switching/power supply unit switching section 31 selects the power supply unit(s) to be used from among the power supply units 32a to 34a in accordance with the control signal and in addition, switches on or off the power-factor improvement circuits PFC 1 to PFC 3 of the power supply units 32a to 34a.

(Details of Operation Control of Power Supply Control System)

Next, description of an operation control of the power supply control system 100b will be made in detail with reference to FIG. 2. FIG. 2 is a flowchart illustrating an example of the operating control of the power supply control system 100 (see FIG. 1), but also illustrating an example of the operation control of the power supply control system 100b.

In Step S0, the liquid crystal television is in any one of the drive modes, for example, the audio only mode, the ornamental image display mode, the modulated dark mode (min), the modulated center mode (typ), and the modulated bright mode (max). Note that, as an example, the light source 41 is driven as follows: under a load in the range from 0 W to 100 W in the audio only mode; under a load in the range from 100 W to 200 W in the ornamental image display mode; under a load in the range from 200 W to 300 W in the modulated dark mode (min); under a load in the range from 300 W to 400 W in the modulated center mode (typ); and under a load in the range from 400 W to 500 W in the modulated bright mode (max).

Then, in Step S1, an operator performs input to the mode switching section 10 (FIG. 7) of the liquid crystal television so as to perform mode selection operation to select any one of the above-mentioned drive modes.

In Step S2, the power supply control system 100b (control section 20) determines whether or not the magnitude of the load in the light source 41 is changed by the mode selection operation performed in Step S1. Note that, details of determination are same as those of Embodiment 1, and thus description thereof is omitted.

In Step S2, when the magnitude of the load in the light source 41 is not changed, processing proceeds to Step S5, the power supply control system 100b continues to supply power to the light source 41 until the mode is selected again (in other words, Step S1 is performed again).

In Step S2, when the magnitude of the load in the light source 41 is changed, processing proceeds to Step S3, and the power supply control system 100b (PFC switching/power supply unit switching section 31) selects the power supply unit(s) to be used from among the power supply units 32a to 34a in accordance with the selected mode. For example, in Step S2, when it is determined that the magnitude of the load in the light source 41 falls within the range from 0 W to 100 W (in other words, the drive mode is switched to the audio only mode), the PFC switching/power supply unit switching section 31 selects a state of performing the power supply operation with only the power supply unit 32a.

Similarly, in Step S2, when it is determined that the magnitude of the load in the light source 41 falls within the range from 100 W to 200 W (in other words, the drive mode is switched to the ornamental image display mode), the PFC switching/power supply unit switching section 31 selects a state of performing the power supply operation with only the power supply unit 33a. When it is determined that the magnitude of the load in the light source 41 falls within the range from 200 W to 300 W (in other words, the drive mode is switched to the modulated dark mode (min)), the PFC switching/power supply unit switching section 31 selects a state of performing the power supply operation with the combination of the power supply units 32a and 33a. When it is determined that the magnitude of the load in the light source 41 falls within the range from 300 W to 400 W (in other words, the drive mode is switched to the modulated center mode (typ)), the PFC switching/power supply unit switching section 31 selects a state of performing the power supply operation with only the power supply unit 34a. When it is determined that the magnitude of the load in the light source 41 falls within the range from 400 W to 500 W (in other words, the drive mode is switched to the modulated bright mode (max)), the PFC switching/power supply unit switching section 31 selects a state of performing the power supply operation with the combination of the power supply units 32a and 34a.

That is, in accordance with the selected drive mode described above, the power supply control system 100b is configured such that the PFC switching/power supply unit switching section 31 selects optimal one or ones of the power supply units 32a to 34a for supplying power to the light source 41. The optimal one or ones of the power supply units 32a to 34a for supplying power to the light source 41 are one or ones which has a minimum sum of the power losses caused by the exciting current generated in the transformers of the power supply units 32a to 34a under the load condition corresponding to the above-mentioned drive mode.

Then, processing proceeds to Step S4, and the power supply control system 100b (PFC switching/power supply unit switching section 31) determines whether the power-factor improvement circuits PFC 1 to PFC 3 of the power supply units 32a to 34a are turned on or not in accordance with the selection in Step S3 (are operated or not).

Then, processing proceeds to Step S5, and the power supply control system 100b supplies power to the light source 41 by using the one or plurality of power supply units that are selected in Step S3 from among the power supply units 32a to 34a. The power supply control system 100b continues to supply power to the light source 41 until the mode is selected again (in other words, Step S1 is performed again).

As described above, in accordance with the selected drive mode, the power supply control system according to this embodiment selects to use optimal one power supply unit or an optimal combination of the power supply units, which optimal one or optimal combination has a minimum sum of the power loss(es) caused by the exciting current generated in the transformers (power supply transformers) of the power supply units. Therefore, an optimum power supply operation, which reduces a power loss, can be realized in any drive modes.

Further, not only in the ornamental image display mode for the liquid crystal television, but also in a fixed brightness mode and in an automatic brightness adjusting mode, the present invention provides the power supplies (each of the power supply units and a combination of the plurality of power supply units), which are used in a multi-stage manner to be optimized for different levels of desired brightness (loads), and the optimum power supplies corresponding to the respective drive modes are selected.

Note that, in the above-mentioned Embodiments 1 to 3, the light source device of the liquid crystal television has been exemplified as an electronic device, but the present invention is not particularly limited thereto. For example, the power supply control system according to the present invention is also appropriately applicable to an electronic device including the plurality of power supplies (power supply units) such as a large flat television or an ultra slim television (television that is restricted in structure). Further, the number of the divided domains illustrated in FIG. 4 and the number of the power supply units illustrated in FIG. 1, FIG. 5, and FIG. 7 are merely examples, thus the number of the divided domains and the power supply units can be appropriately increased or decreased.

Further, as is apparent from the description of the above-mentioned Embodiments 1 to 3 and the like, in the present invention, the first drive mode and the second drive mode represent the plurality of drive states that are different from one another in the load at least during driving. For example, even in one moving image display mode, a state of displaying a bright scene (high-brightness drive mode) and a state of displaying a darker scene (low-brightness drive mode) can correspond to the first drive mode and the second drive mode, respectively. Similarly, a state of outputting a higher volume (maximum volume: high-load drive mode) and a state of outputting a lower volume (minimum volume: low-load drive mode) can correspond to the first drive mode and the second drive mode, respectively.

The power supply control system according to the present invention may further include the power-factor improvement circuit included in the power supply unit to be used in the second drive mode, and the power-factor improvement circuit control section that switches whether to actuate or not actuating the power-factor improvement circuit depending on the kinds of the drive, modes, wherein the power-factor improvement circuit control section actuates the power-factor improvement circuit in the first drive mode, and not to actuate the power-factor improvement circuit in the second drive mode.

According to the above-mentioned configuration, the power-factor improvement circuit is not actuated in the second drive mode that is driven under lower load. Therefore, this embodiment produces an effect in which the loss generated in the power-factor improvement circuit can be reduced in the second drive mode that is more likely to decrease in power usage efficiency.

The power supply control system according to the present invention may be arranged such that an electronic device is a light source device for a liquid crystal display, and the first drive mode is a light mode for the moving image display, and the second drive mode is a light mode for the still image display.

The power supply control system according to the present invention may further include the light source devices configured by the plurality of divided domains, wherein each of the power supply units to be used supplies power to one divided domain in the first drive mode, and the power supply units to be used cooperate to supply power to all the divided domains or the only one power supply unit is used to supply power to all the divided domains in the second drive mode.

The present invention also provides a power control system for controlling power supply operation to supply power to an electronic device having a first drive mode and a second drive mode that is driven under a load lower than a load in the first drive mode, the power control system comprising: a plurality of power supply units each of which includes a transformer; and a power supply unit selection section that depending on which one of the first and second drive modes the electronic device is in, selects one or a plurality of power supply units to be used from the plurality of power supply units, a part of the plurality of power supply units being one or a plurality of power supply units for exclusive use of the second drive mode wherein the one or plurality of power supply units for the exclusive use of the second drive mode are such power supply units in which a power loss caused by an exciting current generated in the transformer under a load condition corresponding to the second drive mode is lower than a loss of the other parts of the plurality of power supply units; and in the first drive mode, the power supply unit selection section supplies power to the electronic device without using the one or plurality of power supply units for the exclusive use of the second drive mode, and supplies power to the electronic device by using the one or plurality of power supply units for the exclusive use of the second drive mode.

According to the above-mentioned configuration, in the second drive mode that is driven under the lower load, the power supply unit that is used only when the power loss is relatively low is used. Therefore, the power loss in the second drive mode can be reduced in comparison with the case where the power supply unit that is used exclusively therefore is not provided. Thus a higher efficient drive can be realized. That is, there is obtained an effect in which the respective power supply units can be driven efficiently depending on the drive modes corresponding to different loads.

The present invention also provides A power control system for controlling power supply operation to supply power to an electronic device having a first drive mode and a second drive mode that is driven under a load lower than a load in the first drive mode, the power control system comprising: a power supply unit including a power-factor improvement circuit; and a power-factor improvement circuit control section that, depending on which one of the first and second drive modes the electronic device is in, switches whether to actuate or not to actuate the power-factor improvement circuit included in the power supply unit, wherein the power-factor improvement circuit control section causes power to be supplied to the electronic device in the first drive mode by actuating the power-factor improvement circuit of the power supply unit, and causes power to be supplied to the electronic device in the second drive mode by not actuating the power-factor improvement circuit of the power supply unit.

According to the above-mentioned configuration, the power-factor improvement circuit is not actuated in the second drive mode that is driven under the lower load. Therefore, the loss generated in the power-factor improvement circuit can be reduced in the second drive mode that is more likely to decrease in power usage efficiency. That is, this embodiment produces an effect in which the respective power supply units can be driven efficiently depending on the drive modes corresponding to different loads.

Furthermore, the present invention provides an electronic device, comprising any one of the above-mentioned power supply control systems, the electronic device having the first mode and the second mode.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

Industrial Applicability

The present invention is applicable as power supply control system for controlling power supply operation to supply power to the electronic device having the plurality of drive modes corresponding to the different loads.

Reference Signs List

31, 31a PFC switching/power supply unit switching section (power supply unit selection section/power-factor improvement circuit control section)

32 to 35 power supply unit power supply unit (power supply unit for the exclusive use of second drive mode)

light source (light source device/electronic device)

100, 100a power supply control system

A to C divided domain

PFC 1 to PFC 4 power-factor improvement circuit

The invention claimed is:

1. A power control system for controlling power supply operation to supply power to an electronic device including a first drive mode and a second drive mode that is driven under a load relatively lower than a load in the first drive mode, the power control system comprising:
   a plurality of power supply units, each including a transformer; and
   a power supply unit selection section to, depending on which one of the first and second drive modes the electronic device is in, select one or a plurality of power supply units to be used from the plurality of power supply units, wherein the power supply unit selection section is configured to select the one or a plurality of power supply units to be used from the plurality of power supply units such that each of the power supply units to be used to supply power to the electronic device in the second drive mode is one or some of each of the power supply units to be used to supply power to the electronic device in the first drive mode;
   power-factor improvement circuits, each respective one of the power-factor improvement circuits being included in a respective one of the plurality of power supply units which is useable to supply power to the electronic device in the second drive mode; and
   a power-factor improvement circuit control section to, depending on which one of the first and second drive modes the electronic device is in, switch whether to actuate or not actuate the power-factor improvement circuit, wherein the power-factor improvement circuit control section is configured to actuate the power-factor improvement circuit in the first drive mode and is configured to not actuate the power-factor improvement circuit in the second drive mode.

2. The power supply control system according to claim 1, wherein:
   the electronic device is a light source device for a liquid crystal display; and
   the first drive mode is a drive mode for a moving image display, and the second drive mode is a drive mode for a still image display.

3. The power supply control system according to claim 2, wherein:
   the light source device has a plurality of divided domains;
   in the first drive mode, each power supply unit to be used supplies power to one of the plurality of divided domains; and
   in the second mode, a plurality of power supply units to be used cooperate to supply power to all the plurality of divided domains or one of the plurality of power supply units is used to supply power to all the plurality of divided domains.

4. An electronic device, comprising:
   a power supply control system according to claim 3,
   the electronic device having the first mode and the second mode.

5. An electronic device, comprising:
   a power supply control system according to claim 2,
   the electronic device having the first mode and the second mode.

6. An electronic device, comprising:
   a power supply control system according to claim 1,
   the electronic device having the first mode and the second mode.

* * * * *